US011442755B1

(12) United States Patent
Patimer et al.

(10) Patent No.: US 11,442,755 B1
(45) Date of Patent: Sep. 13, 2022

(54) SECURE ACCESS TO A CORPORATE APPLICATION USING A FACADE

(71) Applicant: CA, Inc., San Jose, CA (US)

(72) Inventors: David Patimer, Tel Aviv (IL); Lior Lev-Tov, Tel Aviv (IL); Eldad Rudich, Tel Aviv (IL); Leonid Belkind, Tel Aviv (IL)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 16/591,335

(22) Filed: Oct. 2, 2019

Related U.S. Application Data

(60) Provisional application No. 62/832,038, filed on Apr. 10, 2019.

(51) Int. Cl.
  *G06F 9/451* (2018.01)
  *G06F 21/30* (2013.01)
  *G06F 21/33* (2013.01)

(52) U.S. Cl.
  CPC .......... *G06F 9/452* (2018.02); *G06F 21/305* (2013.01); *G06F 21/33* (2013.01)

(58) Field of Classification Search
  CPC ......... G06F 9/452; G06F 21/305; G06F 21/33
  See application file for complete search history.

(56) References Cited

U.S. PATENT DOCUMENTS

| 7,475,420 B1 | 1/2009 | Hernacki |
| 9,578,063 B1 | 2/2017 | Iyer et al. |
| 9,813,418 B1 | 11/2017 | Banerjee |
| 9,813,478 B2 | 11/2017 | Koo et al. |
| 10,038,726 B2 | 7/2018 | Gaddam et al. |
| 10,171,484 B2 | 1/2019 | Balasubramanian et al. |

(Continued)

FOREIGN PATENT DOCUMENTS

WO   WO-2011-126507 A1   10/2011

OTHER PUBLICATIONS

Rouse, Margaret; Tech Target: "immutable inftastructure"; webpage located at: https://searchitoperations.techtarget.com/definition/immutable-infrastructure; Jul. 2016; 4 pages.

(Continued)

*Primary Examiner* — Nasser M Goodarzi
*Assistant Examiner* — Adil Ocak
(74) *Attorney, Agent, or Firm* — Adsero IP

(57) ABSTRACT

Secure access to a corporate application using a facade. In some embodiments, a method may include receiving, at a secure access cloud point of delivery (PoD), from a client application on a client device, a request to access a corporate application that is deployed in a corporate datacenter. The method may also include creating, at the secure access cloud PoD, a facade representing the corporate application. The method may further include forwarding, from the facade, to a connector that is also deployed in the corporate datacenter, the request. The method may also include brokering, by the connector and the facade, authentication of a user, authorization of access by the user, and a secure communication session between the client application and the corporate application via the facade, with the client application being unaware that the secure communication session is brokered by the connector and the facade.

20 Claims, 10 Drawing Sheets

(56) References Cited

U.S. PATENT DOCUMENTS

| | | | |
|---|---|---|---|
| 10,284,532 | B2 | 5/2019 | Quinlan et al. |
| 10,397,185 | B1 | 8/2019 | Sandholm et al. |
| 10,425,411 | B2 | 9/2019 | Huang |
| 10,962,136 | B2 | 3/2021 | Tolentino |
| 2004/0022237 | A1 | 2/2004 | Elliot et al. |
| 2005/0125083 | A1 | 6/2005 | Kiko |
| 2006/0122861 | A1* | 6/2006 | Scott ............ G06Q 10/00 705/7.19 |
| 2008/0146265 | A1 | 6/2008 | Valavi |
| 2010/0174811 | A1 | 7/2010 | Musiri et al. |
| 2014/0075031 | A1 | 3/2014 | Doering et al. |
| 2014/0172483 | A1* | 6/2014 | Bellers ............ G06Q 50/14 705/7.16 |
| 2014/0195805 | A1 | 7/2014 | Koo et al. |
| 2014/0317409 | A1 | 10/2014 | Bartok et al. |
| 2014/0366080 | A1* | 12/2014 | Gupta ............ H04W 4/60 726/1 |
| 2016/0378535 | A1* | 12/2016 | Oh ............ G06F 9/452 718/1 |
| 2017/0149733 | A1 | 5/2017 | Chastain et al. |
| 2018/0063164 | A1 | 3/2018 | Balasubramanian et al. |
| 2018/0219736 | A1 | 8/2018 | Bugenhagen et al. |
| 2018/0287864 | A1 | 10/2018 | Hockett et al. |
| 2018/0367557 | A1 | 12/2018 | Brown et al. |
| 2019/0020723 | A1 | 1/2019 | Kumar et al. |
| 2019/0068641 | A1* | 2/2019 | Araujo ............ G06F 21/54 |
| 2019/0081930 | A1 | 3/2019 | Hunt, IV |
| 2019/0190960 | A1 | 6/2019 | Amro et al. |
| 2019/0208009 | A1 | 7/2019 | Prabhakaran et al. |
| 2020/0241926 | A1 | 7/2020 | Guim Bernat |
| 2020/0250009 | A1* | 8/2020 | Jaeger ............ G06F 8/60 |
| 2021/0019194 | A1 | 1/2021 | Bahl et al. |
| 2021/0311655 | A1 | 10/2021 | Benjamin et al. |

OTHER PUBLICATIONS

Wikipedia, "Flow control (data)"; on-line encyclopedia; webpage located at: https://en.wikipedia.org/wiki/Flow_control_(data); Sep. 13, 2019; 6 pages.

U.S. Appl. No. 16/591,318 titled "Secure Access to a Corporate Application Over a Websocket-Based Connection Using a Facade"; filed Oct. 2, 2019; 60 pages.

U.S. Appl. No. 16/591,347; titled "Secure Access to a Corporate Web Application With Translation Between an Internal Address and an External Address"; filed Oct. 2, 2019; 43 pages.

U.S. Appl. No. 16/591,365; titled "Secure Access to a Corporate Application in an SSH Session Using a Transparent SSH Proxy"; filed Oct. 2, 2019; 51 pages.

U.S. Appl. No. 16/591,318, Non-Final Office Action, dated Dec. 24, 2021, 37 pages.

U.S. Appl. No. 16/591,347, Non-Final Office Action, dated Sep. 2, 2021, 24 pages.

U.S. Appl. No. 16/591,347, Notice of Allowance, dated Jan. 14, 2022, 21 pages.

U.S. Appl. No. 16/591,365, Non-Final Office Action, dated Sep. 23, 2021, 30 pages.

U.S. Appl. No. 16/591,365, Notice of Allowance, dated Mar. 17, 2022, 15 pages.

U.S. Appl. No. 16/591,347, Notice of Allowance, dated Apr. 15, 2022, 148 pages.

U.S. Appl. No. 16/591,318, Final Office Action, dated Jun. 27, 2022, 43 pages.

* cited by examiner

| Accessed Resource Type | Protocol | Accessing Application | Authentication Schemes |
|---|---|---|---|
| Web Portal / Application | HTTPS | Any Web Browser Supporting HTTPS 1.1 | Session Authentication - SAML, OAUTH2, OpenID Connect, User/Password + MFA |
| REST / SOAP APIs | HTTPS | Any Application Supporting TLS-Based REST/SOAP API Client | OAuth2 |
| SSH Server (Linux / Unix / Windows) | SSH | Any SSH Client | One-Time Token, RSA Keys |
| SCP/SFTP Server | SSH | Any SCP/SFTP Client | One-Time Token, RSA Keys |
| Windows Remote Desktop Servers | RDP Over HTTPS | Any Microsoft Remote Desktop Protocol Client Supporting Remote Desktop Gateways | NTLM, SPNEGO |
| Native Application To Its Dedicated Back-End | TCP Over SSH | Any Native Application Supporting SSH Tunneling Or Any Native Application In Combination With SSH Client Supporting Tunneling | One-Time Token, RSA Keys |

FIG. 3

SECURE ACCESS TO A CORPORATE APPLICATION USING A FACADE

CROSS-REFERENCE TO A RELATED APPLICATION

This application claims the benefit of, and priority to, U.S. Provisional Application No. 62/832,038, filed Apr. 10, 2019, which is incorporated herein by reference in its entirety for all that it discloses.

BACKGROUND

Organizations have traditionally secured their networks using a perimeter-based approach. In a traditional perimeter-based approach to network security, an organization may have a local area network that includes devices hosting corporate network resources (e.g., corporate applications, services, and/or workloads) housed in a well-defined location, such as in the organization's headquarters building or dedicated datacenter. The network may be secured using a traditional security perimeter and firewall that can protect the devices within the network from attack. When a user seeks to use corporate network resources hosted in those locations from their device (e.g., from their mobile device), the user may connect their device to the network from outside the security perimeter by employing software installed on the device, such as virtual private network (VPN) software, to create a secure connection with the network in order to access corporate network resources.

One challenge to a perimeter-based approach to network security is that more and more organizations are moving corporate network resources outside their network perimeters to the cloud. This has resulted in network architectures that are generally cloud-oriented and do not have a traditional network perimeter. For example, more and more organizations utilize corporate network resources that are hosted by multiple third parties, such as Azure, Amazon Web Services (AWS), and Google. Enterprise IT security programs can become complicated and difficult as organizations outsource infrastructure in this manner while remaining responsible for data and users. Further, users increasingly desire to have access to corporate network resources whether on-premises or off-premises, and at any time of day or night, also known as "anytime, anywhere access." However, using traditional network security approaches, such as using VPN software installed on a device, is increasingly burdensome to users in cloud-oriented network architectures.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for secure access to a corporate application using a facade may be performed, at least in part, by a computer system including one or more processors. The method may include receiving, at a secure access cloud point of delivery (PoD), from a client application on a client device, a request to access a corporate application that is deployed in a corporate datacenter. The method may also include creating, at the secure access cloud PoD, a facade representing the corporate application. The method may further include forwarding, from the facade at the secure access cloud PoD, to a connector that is also deployed in the corporate datacenter, the request to access the corporate application. The method may also include brokering, by the connector and the facade at the secure access cloud PoD, authentication of a user, authorization of access by the user, and a secure communication session between the client application and the corporate application via the facade, with no corresponding agent being installed at the client device, and with the client application being unaware that the secure communication session is brokered by the connector and the facade at the secure access cloud PoD.

In some embodiments, the facade may pose as the corporate application and may behave similarly to the corporate application.

In some embodiments, the facade may include a DNS name and port resolving thereto that are unknown to the client application. In these embodiments, when the client application connects to the facade, the client application may believe it is connected to the corporate application.

In some embodiments, the method may further include volumetric logging, by the facade at the secure access cloud PoD, of the secure communication session.

In some embodiments, the method may further include auditing, by the facade at the secure access cloud PoD, of the secure communication session.

In some embodiments, the method may further include analyzing and modifying, by the facade at the secure access cloud PoD, a request or a response of the secure communication session.

In some embodiments, the method may further include analyzing and delaying, by the facade at the secure access cloud PoD, a request or a response of the secure communication session.

In some embodiments, the method may further include analyzing and dropping, by the facade at the secure access cloud PoD, a request or a response of the secure communication session.

In some embodiments, the method may further include identifying, by the facade at the secure access cloud PoD, a sensitive command about to be executed by the client application, and sending, by the facade at the secure access cloud PoD, a notification to an IT administrator regarding the sensitive command.

In some embodiments, the secure communication session employs Hypertext Transfer Protocol Secure (HTTPS), Secure Shell (SSH), Remote Desktop Protocol (RDP), Secure Copy Protocol (SCP), or SSH File Transfer Protocol (SFTP).

In some embodiments, a computer-implemented method for secure access to a corporate Secure Shell (SSH) server using a facade may be performed, at least in part, by a computer system including one or more processors. The method may include receiving, at a secure access cloud point of delivery (PoD), from an SSH client application on a client device, a request to access a corporate SSH server that is deployed in a corporate datacenter. The method may also include creating, at the secure access cloud PoD, a facade representing the corporate SSH server. The method may further include forwarding, from the facade at the secure access cloud PoD, to a connector that is also deployed in the corporate datacenter, the request to access the corporate SSH server. The method may also include brokering, by the connector and the facade at the secure access cloud PoD, authentication of a user, authorization of access by the user, and a secure communication session between the SSH client application and the corporate SSH server via the facade, with no corresponding agent being installed at the client device, and with the SSH client application being unaware that the secure communication session is brokered by the connector and the facade at the secure access cloud PoD.

In some embodiments, a public certificate authority (CA) certificate may be deployed on the corporate SSH server. In these embodiments, the corporate SSH server may be configured to validate session certificates of the secure communication session. Also, in these embodiments, no active agent may be present at the corporate SSH server.

In some embodiments, the method may further include causing, by the facade at the secure access cloud PoD, a certificate authority (CA) to generate a unique short-lived certificate for the secure communication session that has specific session parameters embedded therein.

In some embodiments, the method may further include enforcing, by the facade at the secure access cloud PoD, a local access policy to decide whether to provide access to the corporate SSH server, specified authentication types, and/or 4-eyes access and operations approval.

In some embodiments, the method may further include controlling, by the facade at the secure access cloud PoD, specific shell commands, output data, Secure Copy Protocol (SCP) files, and/or SSH File Transfer Protocol (SFTP) files.

In some embodiments, the method may further include deceiving, by the facade at the secure access cloud PoD, a potentially malicious user by providing the potentially malicious user with false data and/or a false indication on a result of a performed operation.

In some embodiments, the method may further include detecting and logging, by the SSH client application, sensitive information being input by the user to avoid the sensitive information being logged in an audit log by replacing the sensitive information with benign characters in the audit log.

In some embodiments, one or more non-transitory computer-readable media may include one or more computer-readable instructions that, when executed by one or more processors of a computer system, cause the computer system to perform a method for secure access to a corporate application or a corporate SSH server using a facade.

In some embodiments, a computer system may include one or more processors and one or more non-transitory computer-readable media. The one or more non-transitory computer-readable media may include one or more computer-readable instructions that, when executed by the one or more processors, cause the computer system to perform a method for secure access to a corporate application or a corporate SSH server using a facade.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIG. 3 is a table summarizing various supported connectivity scenarios and authentication schemes;

DETAILED DESCRIPTION

Traditional perimeter-based approaches to network security have required users who desire to access corporate network resources (e.g., corporate applications, services, and/or workloads) to do so using a device that is either located within a secure perimeter of a network or that is connected to the network using software installed on the device, such as virtual private network (VPN) software. While users increasingly desire to have "anytime, anywhere access" to corporate network resources, using traditional network security approaches, such as using VPN software installed on a device, is increasingly burdensome to users in cloud-oriented network architectures.

The embodiments disclosed herein may provide various benefits. In particular, the embodiments disclosed herein may, for example, enable secure access to corporate network resources (e.g., corporate applications, services, and/or workloads) located in a variety of environments, such as self-hosted datacenters, co-location/hosting, Infrastructure-as-a-Service, Platform-as-a-Service, Software-as-a-Service and more. For example, embodiments disclosed herein may enable organizations to secure their networks without requiring devices to connect to the network within a traditional security perimeter and without requiring devices to connect to the network by installing software on the devices, such as VPN software. Instead, embodiments disclosed herein may enable organizations to have network architectures that are generally cloud-oriented and that are inside or outside a traditional network perimeter, as well as enabling organizations to utilize network resources that are hosted by multiple third parties such as Azure, AWS, and Google, all while enabling users to have "anytime, anywhere access" to network resources.

Figure 1:
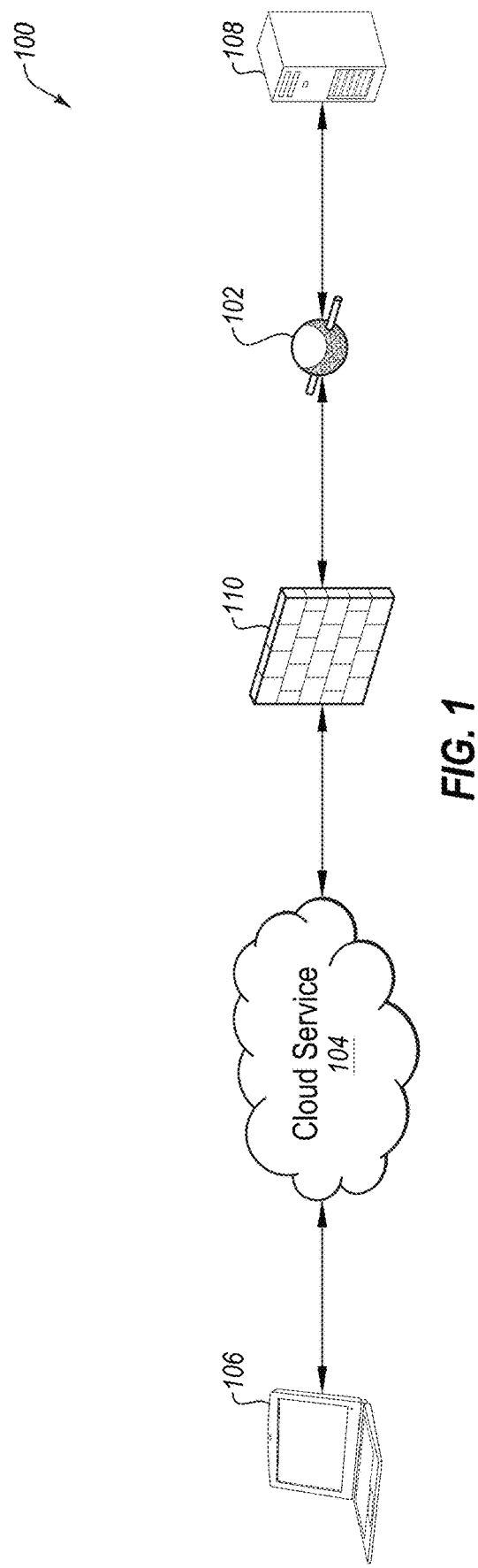
FIG. 1 illustrates an example system configured for providing secure access to corporate network resources.

Turning to the figures, FIG. 1 illustrates an example system 100 configured for providing secure access to corporate network resources. Some embodiments may include an example Software as a Service (SaaS) platform, that may allow corporate information technology (IT) organizations to provide secure connectivity to corporate applications and services for designated audiences. The SaaS platform may provide this secure connectivity without exposing internal networks/datacenters to risks associated with network access, and may provide visibility and governance into activities that are performed by the accessing parties.

As disclosed in FIG. 1, the SaaS platform may be configured to provide access by including a connector 102 deployed inside (e.g., behind a firewall 110 of) the corporate datacenter (which may be physical or virtual) that is configured to reach out to a cloud service 104 Point of Delivery (PoD) and configured to wait for requests from authorized/authenticated users for resources. The user at their device 106 (e.g., their workstation or mobile device) may run any kind of client application (e.g., a web browser, a Secure Shell (SSH) client, a Remote Desktop Protocol (RDP) client, a database workbench, etc.) and may then connect to a particular corporate resource 108 by name (e.g., myresource.mycompany.com). The client application may then connect to the cloud service 104 (where the Domain Name System (DNS) record points) and the cloud service 104 may handle the authenticating of the user, the authorizing of the access (as well as taking additional steps), and the brokering of the connectivity (e.g., via Layer 7) to the actual resource.

Figure 2:
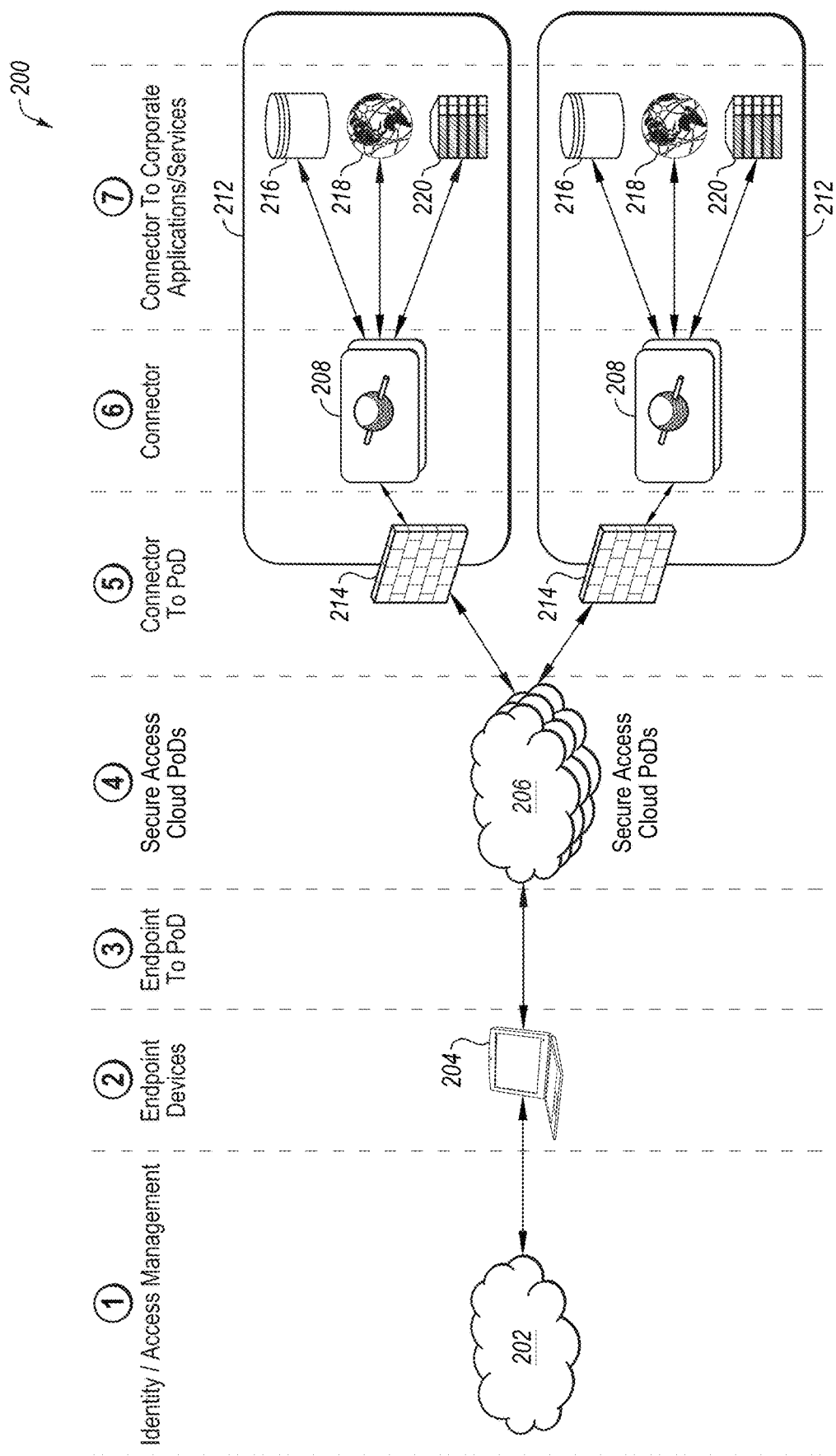
FIG. 2 illustrates another example system configured for providing secure access to corporate network resources.

FIG. 2 illustrates another example system 200 configured for providing secure access to corporate network resources. More particularly, FIG. 2 illustrates various layers of the SaaS platform disclosed herein.

Layer 1 of FIG. 2 is an identity/access management layer. Some enterprise solutions may be deployed either as an Identity as a Service (IDaaS) or on a corporate premises. The SaaS platform disclosed herein may be configured to integrate with any Security Assertion Markup Language (SAML), OpenID Connect/OAuth2 provider, as well as with dedicated on-premises deployments of Microsoft Active Directory and other Lightweight Directory Access Protocol (LDAP)-based identity solutions. For example, the SaaS platform disclosed herein may support any of the following authentication methods 202 for end-users and administrators:

Microsoft Azure Active Directory—can support Microsoft Azure Active Directory using Azure AD Connect synchronization, and can also be used in combination with Active Directory Federation Services (ADFS) to authenticate via an on-premises infrastructure.

Microsoft Active Directory—may involve either installing an on-premises agent for synchronization and passthrough authentication or using ADFS, in which case the on-premises agent may only be used for users/groups synchronization.

Okta—can support various Directory Services using dedicated Okta Connectors.

OneLogin—can support various Directory Services using dedicated OneLogin Connectors.

Google GSuite.

Authentication via OAuth2/OpenID Connect or SAML protocols with external Identity Providers (IdPs).

Internal Users Database.

The authentication methods 202 may provide access to an Administrative Portal, a User Portal, and applications and services delivered through the SaaS platform. When accessing SSH servers via the SaaS platform, or when connecting to native applications with SSH tunneling, the SaaS platform may support the following authentication methods 202 for SSH sessions (which may not replace the corporate identity services above, but may serve as a bridge to a corporate identity of the accessing party, as governed by the identity providers):

Temporary Access Token (generated from the User Portal upon successful authentication using any of the above methods).

Using a Rivest-Shamir-Adleman (RSA) Key generated in the User Portal.

Layer 2 of FIG. 2 is an endpoint devices layer. The SaaS platform disclosed herein may be a client-less solution, capable of providing secure access/connectivity from any endpoint device 204, such as any personal computer (PC) platform (e.g., Windows, Mac OS X, or Linux) or any mobile platform (e.g., iOS, Android, etc.), as well as from dedicated embedded or thin-client platforms (e.g., Chromebook, etc.). This secure access/connectivity may be delivered using the standard applications including, but not limited to, web browsers, SSH clients, RDP clients, service-2-service or API access, as well as dedicated applications for accessing databases, data warehouses, and other special repositories. To ensure that access to sensitive corporate resources is performed only from compliant devices, the SaaS platform can integrate with Endpoint Threat Detection and Response (EDR), Mobile Device Management, and Device Security Posture management solutions.

Layer 3 of FIG. 2 is a connectivity layer. The connectivity between applications running on users' endpoints and the SaaS platform disclosed herein (referred to in FIG. 2 as the secure access cloud PoDs 206) may be accomplished over point-to-point secure connections, using Transport Layer Security (TLS) 1.2 for example. The SaaS platform either may provide automatically-generated TLS certificates or may integrate with existing corporate Public Key Infrastructure (PKI) to generate them. FIG. 3 is a table 300 summarizing various supported connectivity scenarios and authentication schemes. However, the SaaS platform disclosed herein is not limited to supporting only the protocols disclosed in the table 300 of FIG. 3. Instead, any point-to-point Transmission Control Protocol (TCP) connection, point-to-point protocols based on UDP, such as QUIC or upcoming HTTP/3, as well as dedicated TCP protocols (e.g., over TCP Port xyz), may be supported, among others.

Layer 4 of FIG. 2 is a secure access cloud PoDs layer. The secure access cloud PoDs 206 may be deployed in resilient and scalable Infrastructure as a Service (IaaS) datacenters hosted, for example, by AWS and Microsoft Azure. The secure access cloud PoDs 206 may also be deployed on bare-metal or hosting facilities, limiting their scalability to the resources provided by the specific facility. Each of the secure access cloud PoDs 206 may be deployed as immutable infrastructure, isolated from all other networks managed by the SaaS platform disclosed herein. The secure access cloud PoDs 206 and the service operations may be subject to continuous internal and external audits and reports and certifications, such as, but not limited to:

AICPA SSAE 18 SOC 2 Type II Report

ISO 27001 Certification

FedRAMP Certification

AWS Well Architected Review/Report

Penetration tests performed by third party organizations

Transparency in observability of operational practices, uptime statistics and other parameters of the secure access cloud PoDs 206 may be a desirable feature of the platform.

The SaaS platform disclosed herein may deploy numerous management, monitoring, and security solutions to ensure uninterrupted service for customers, including protection from advanced attacks, including Distributed Denial of Service (DDoS) attacks. Further, the SaaS platform disclosed herein may be designed to ensure uninterrupted access for end-users when a deployment/upgrade is performed using a "draining" technique.

Figure 4:
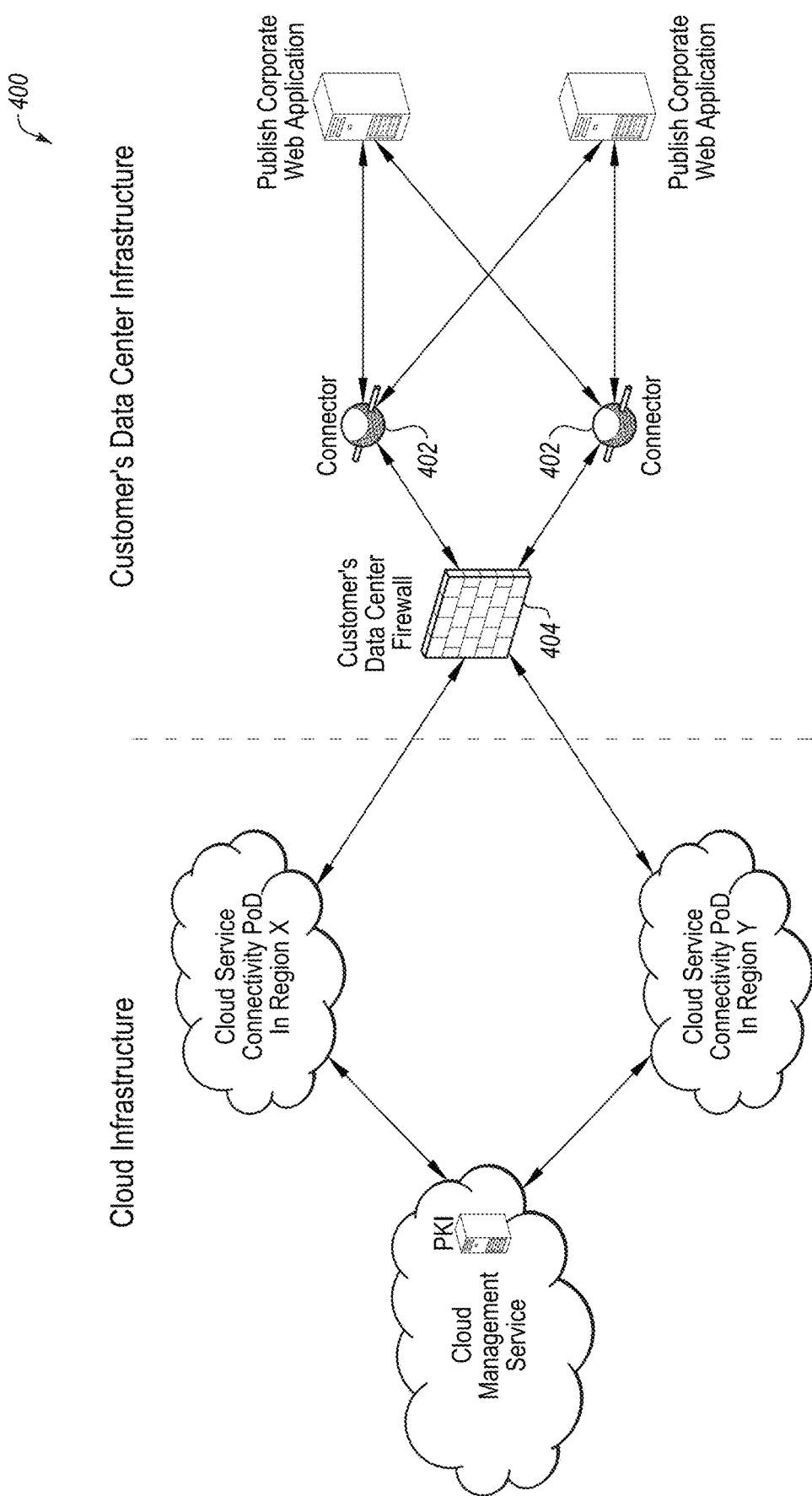
FIG. 4 illustrates an example communication scheme.

Layer 5 of FIG. 2 is a connectivity layer. The connectivity between the connectors 208 and the secure access cloud PoDs 206 may be performed via outgoing connections (e.g., from the connectors 208 that are deployed inside the corporate datacenters 212 behind firewall 214), such as over TCP Port 443 to the secure access cloud PoD 206. Minimizing the number of ports/services used and reducing (e.g., to zero) the number of required changes in the existing perimeter security policies deployed in the corporate datacenters 212 may result in relatively fast deployment of the service. Each connector 208 may open a number of persistent communication channels to one or more secure access cloud PoD 206, and the connector 208 might open/close connections based on the configured applications and the load on those applications (e.g., elasticity based). FIG. 4 illustrates an example communication scheme 400. In particular, FIG. 4 illustrates various technical details of the communications between the connectors 402 (e.g., which may be deployed in physical or virtual datacenters hosting applications) and the secure access cloud PoDs. As illustrated in FIG. 4, the communications between the connectors and the secure access cloud PoDs may be carried out over TCP Port 443 and may be initiated by the connectors 402. The datacenter's firewall 404 may be required to allow outbound communication on this port to secure access cloud destinations. The outbound connections may be carried out with a binary protocol. The connections may be long-term/persistent, but if they are terminated, the connector 402 may attempt to recreate them as quickly as possible. The connections may be secured using TLS with both sides authenticating each other (including certificate pinning) as follows:

Secure Cloud Service—Each PoD (e.g., each component that terminates TLS inside each PoD) may have ephemeral certificates that are allocated by a dynamic PKI. The connector may be capable of checking the validity of these certificates to make sure that it is communicating directly with the secure cloud service.

Connector—When initiated, each connector 402 may receive an ephemeral One Time Password/Token (OTP), allowing it to establish initial communications with the secure cloud service and pull a TLS certificate. From this point, every communication between the connector 402 and the secure cloud service may be done with the certificate, including pulling new certificates (e.g., rotation of certificates). The secure cloud service may perform a strong pinning of each new certificate for each connector 402, monitor anomalies regarding the usage of various client certificates, and/or enforce strong segmentation in access to data and services based on the presented client certificate of a connector 402.

The above scheme may ensure that the connectivity between the connector 402 and the secure cloud service is carried out with the highest level of security, using the most up-to-date cipher suites and without any inspection in the middle. In cases where a TLS inspection of all traffic going from a data center to Internet services is required, trust can be established by connectors 402, cloud service PoDs, and a TLS-intercepting Secure Web Gateway/Proxy.

Layer 6 of FIG. 2 is a connector layer. Connectors 208 may be lightweight software agents that are deployed in the corporate datacenters 212 (which may be physical or virtual). Connectors 208 may help implement network access isolation, required by the Zero Trust Access model, by opening outbound communication channels to the secure access cloud PoDs 206 and brokering the requests from accessing parties to the corporate applications 216, services 218, and workloads 220. Connectors 208 may be cloud-native resilient and scalable components, and may be distributed as Docker Containers, as well as using other means. Connectors 208 may be deployed on any physical or virtual server, as well as inside Container Orchestration environments including, but not limited to, Kubernetes, Amazon Elastic Container Service, Azure Container Instances, etc. Connectors 208 may support full high-availability and load-balancing and may scale horizontally to support a growing number of connections. Upon its creation, each connector 208 may be initiated with a unique One-Time Token.

Layer 7 of FIG. 2 is a connectivity to applications/services layer. Connectivity between the connectors 208 and the corporate applications 216, services 218, and workloads 220 that are accessed via the secure access cloud PoDs 206 may take place inside the corporate datacenters 212. The number of connectors 208 in each corporate datacenter 212 may depend on the network segmentation strategy adopted by the organization using secure access cloud PoDs 206. The connectors 208 may be configured to be able to access the internal address of the configured resource via TCP/IP and, in relevant cases, UDP. Internal network segmentation strategies may be adopted that are targeted at preventing lateral movements resulting from potential application vulnerabilities. There may be no limitation on the number of connectors 208 that can be deployed in a single environment. Further, encrypted communications may be used inside the corporate datacenter 212. For example, when defining internal addresses for web applications or Representational State Transfer (REST)/Simple Object Access Protocol (SOAP) Application Programming Interface (API) endpoints, it may be preferable to use Hypertext Transfer Protocol Secure (HTTPS) over Hypertext Transfer Protocol (HTTP).

If an Enterprise Certificate Authority (CA) is used for internal HTTPS communications, trust may be configured between the Enterprise CA and the connectors 208. The connectors 208 deployed in the corporate datacenters 212 may open two types of secure HTTPS connections, namely (1) connections with the secure access cloud PoDs 206, and (2) connections with internal corporate applications 216. Authentication for connectivity of type (1) may be carried out with certificates issued by Certificate Authorities (CAs) that can be recognized and validated by the connectors 208. One exception may be when dealing with authorized enterprise TLS-inspecting proxies deployed in the corporate datacenters 212. Authentication for connectivity of type (2) (e.g. connections with internal web servers deployed in the customers' datacenters 212 using HTTPS) can require the connector 208 to validate certificates that are either self-signed or are issued by a CA that is not generally recognizable. Self-signed certificates or CA root certificates for validating certificates issued by Enterprise CAs may be added to the list of trusted certificates for all the connectors 208 running in the relevant corporate datacenters 212.

Figure 5:
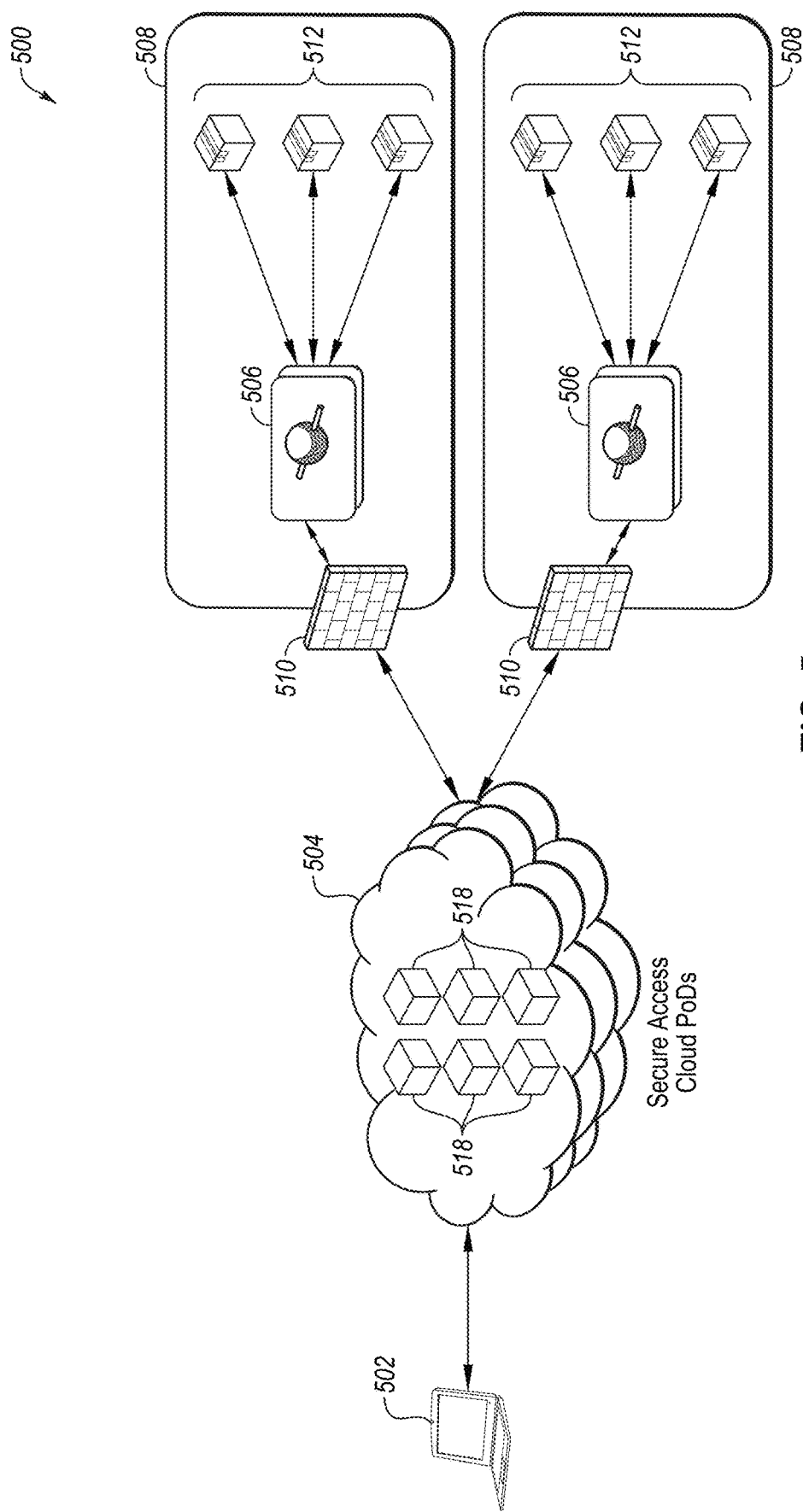
FIG. 5 illustrates facades representing internal resources.

FIG. 5 illustrates a system 500 of facades representing internal resources. As disclosed in FIG. 5, the system 500 may include a client 502, secure access cloud PoDs 504, connectors 506 that are deployed inside corporate datacenters 508 behind firewalls 510, internal corporate resources 512 (e.g., corporate applications, services, and workloads), and facades 518. In some embodiments, each of the facades 518 may be created for an internal corporate resource (e.g., a web server, a REST API server, an SSH server, or any other server/service, based on a TCP or UDP protocol) that is accessible via the Internet in a secure manner. The facade 518 may not expose the internal corporate resource 512 (e.g., internal to the corporate datacenter 508 by being behind the corporate firewall 510) in any way, and may not allow unauthenticated or unprotected access to the internal corporate resource 512. However, the facade 518 may resemble the behavior of the actual internal corporate resource 512. A schematic illustration of these facades 518 is disclosed in system 500 of FIG. 5.

The facades 518 may be virtual in that they are not created ahead of time, but are instead created on demand. For example, when a client connection attempting to access a certain corporate resource 512 is being accepted by one of the secure access cloud PoDs 504, a per-session facade posing as the actual corporate resource 512 may be created ad-hoc. Each facade 518 may have an appearance similar to the original corporate resource 512 in at least two ways. First, the facade 518 may have a DNS name and port resolving to it, with both of these resources being shared between multiple facades 518, but this may be unknown to the accessing client 502. Second, when connecting to this DNS name and port, and passing authentication/authorization, the client 502 may believe it is being connected to the actual corporate resource 512.

The ability to deliver this experience in a smooth way depends on a "virtual hosting" mechanism that can be delivered for different protocols. The ability to understand what specific corporate resource 512 the client 502 is attempting to access can be implemented in different ways for different protocols. The three following examples are illustrative. In a first example, for HTTPS (e.g., web applications, REST/SOAP API connections, etc.), this may be implemented by identifying the corporate resource 512 in the Server Name Identification (SNI) TLS extension, as well as validating it in the Host header of the HTTP requests. In a second example, for generic Secure Socket Layer (SSL)/TLS, this may be done in a similar manner, looking either at a client certificate and retrieving the corporate resource 512 it is trying to connect to from its Subject, as well as looking at the SNI TLS extension. In a third example, for SSH and SSH-based (SCP, SFTP, Git, SSH tunneling) connections, this may be done by encoding the actual corporate resource 512 in the user name. It is understood that the foregoing three examples are illustrative only, and do not limit the general approach of the facade logic disclosed herein.

In particular, the general approach of the facade logic may function as follows. Prior to accepting any client connections, one of the connectors 506 may be deployed in the network with accessibility to the real corporate resource 512, a configuration may be defined to provide access to certain corporate resource(s) 512 and is pulled by the connector 506, and DNS entries may be created to direct the client traffic to the secure access cloud PoDs 504 that have connections to the connectors 506 that can broker connectivity to the specific corporate resources 512 (e.g., with either specific per-resource DNS entries, or wildcards allowing certain subdomains to contain unlimited amount of the facades/resources). Then, when a client connection attempt is registered by the secure access cloud PoD 504, the actual corporate resource 512 that the client 502 is attempting to access may be identified, that such corporate resource 512 exists in the system 500, and that the system 500 has connectivity to it may be verified. Next, the accessing party (user or service) may be authenticated (per a policy), whether the authenticated accessing party is authorized to access this specific corporate resource 512 may be verified, and connectivity to the corporate resource 512 (Proxy) may be brokered, all while the activities inside the connection are continuously inspected, modified or blocked, suspended until further authentication, etc. (if needed), and audited (on the application layer including details about the operation being performed and data being accessed). Depending on the protocol used, a facade 518 may contain additional protocol-specific logic, but a generic facade for TLS/TCP traffic, without protocols specification, may at least include authentication/authorization functionality and volumetric logging/auditing functionality (potentially, including traffic capture).

Figure 6:
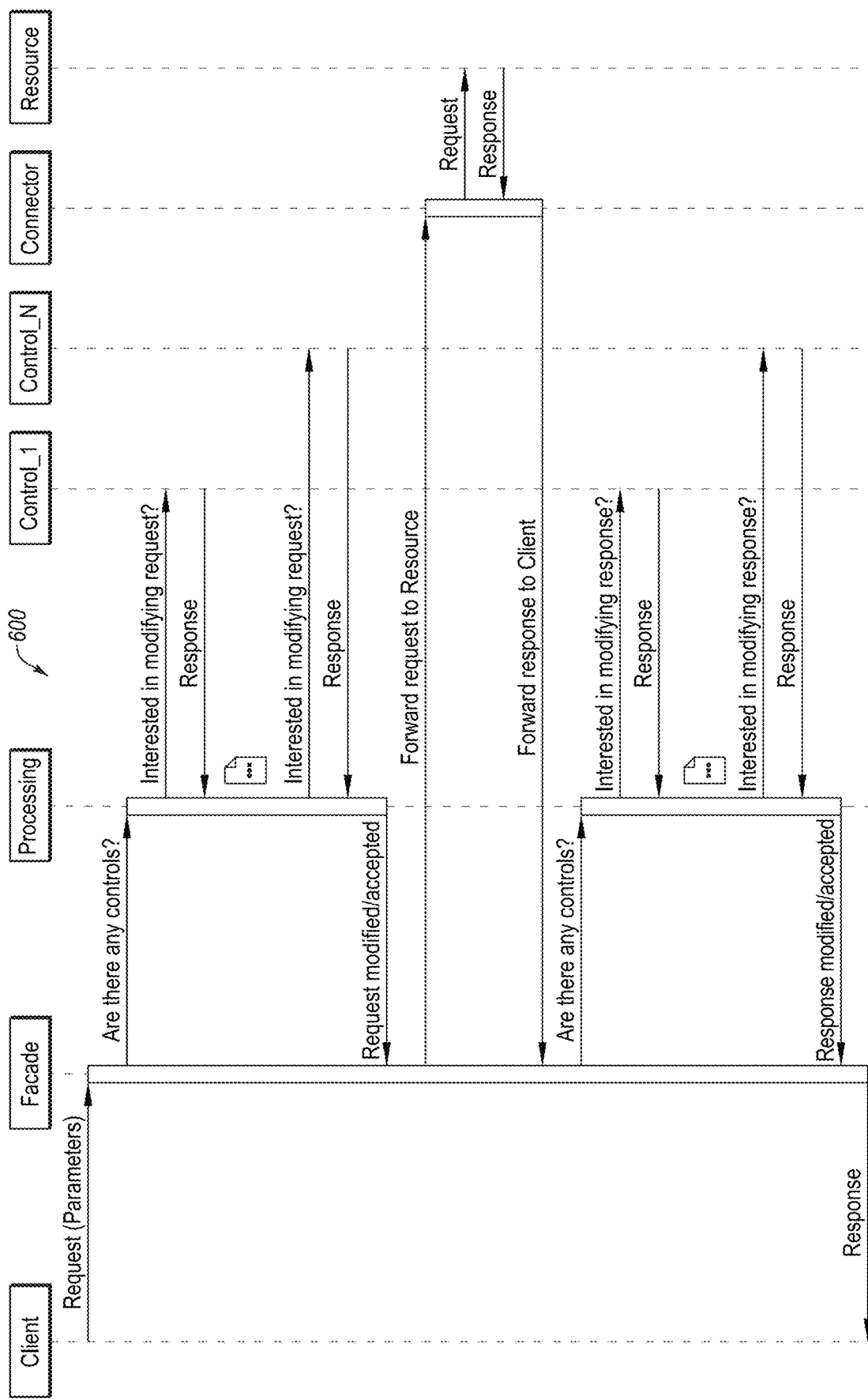
FIG. 6 is a diagram of flow requests for generic transparent in-session controls via facades.

FIG. 6 is a diagram 600 of flow requests for generic transparent in-session controls via facades. In some embodiments, an extension to the facades and resource discovery mechanisms disclosed herein is a facade (paired with a healthy connectivity route) that goes beyond just blindly passing requests from the client to the resource and just blindly passing responses back from the resource to the client, but instead is capable of more advanced functionality including analyzing, modifying, delaying and, if needed, dropping some resources or some responses (or portions thereof) depending on configuration and logic executed either internally inside the secure access cloud PoD or externally, via a set of API calls. All of this advanced functionality may be done while making the appearance of a direct connectivity between the client and the resource. For example, this advanced functionality may be applied to any protocol proxied on Layer 7. In some embodiments, this advanced functionality may be leveraged for web applications, REST APIs, or access to SSH sessions, but is not limited to these protocols or examples. A generic flow is disclosed in the diagram 600 of FIG. 6.

Each of the controls depicted in FIG. 6 may process the information provided to it in one of the following three ways. First, the controls may perform analysis of the specific provided request/response content and metadata and, based on static policy, make a decision whether the request/response should be allowed to pass the way it is, or whether portions of its content or metadata should be modified. Alternatively, the control can decide to block the request altogether. Second, the controls may perform analysis of the specific provided request/response content and metadata as well as the historical data or metadata on similar requests loaded out of band from an external repository, ad hoc, or in advance. Based on this data, the controls may make a decision whether the request/response should be allowed to pass the way it is, or whether portions of its content or metadata be modified. Alternatively, the control can decide to block the request altogether. Third, the controls may perform analysis of the specific provided request/response content and metadata and call an external resource/API, passing it some or all of the request/response data/metadata and, potentially, additional data/metadata loaded from external repositories, then decide to modify/block/accept the request/response based on an external input.

The following three examples implement aspects of these controls. In a first example, a user may access a specific resource inside a web application. Static policy control may direct the system to modify all attempts to access resource X to serving resource Y instead (e.g., link translation). In a second example, a user may try to download an attachment. The system may analyze the history of the user's activity and realize that this is the fifth attachment that the user is trying to download within the last three seconds. The system may analyze a generic pace of attachments downloading for other users and calculate a significant deviation from an expected norm. The system may then decide either to block downloading the attachment or to send another document instead of the attachment. In a third example, a user may try to execute a command in an interactive SSH session. The system may identify that this command is listed in a policy identifying sensitive commands. The system may then call an external API notifying an IT administrator that a sensitive command is about to be executed, while providing all the relevant context (e.g., the user attempting to execute the sensitive command, the sensitive command content and arguments, the resource on which the operation is taking place, the history of activity of that user, etc.). An external system may then involve a human IT administrator to make a decision and respond, such as by directing (via API) the system to either allow the original command to be executed, or to be modified or blocked, as well as defining the response the attempting user will receive. Alternatively, another API can be used to request the attempting user to validate the command via strong authentication. These three examples illustrate some potential advantages. While these specific examples are targeting HTTPS and SSH protocols, the same principles could be applied to any other protocol including, but not limited to REST, SOAP, RDP, a database connection, SCP, SFTP, Git, and many others, and including the ability to handle specific proprietary TCP or User Datagram Protocol (UDP) based protocols via development of specific plugins.

Figure 7:
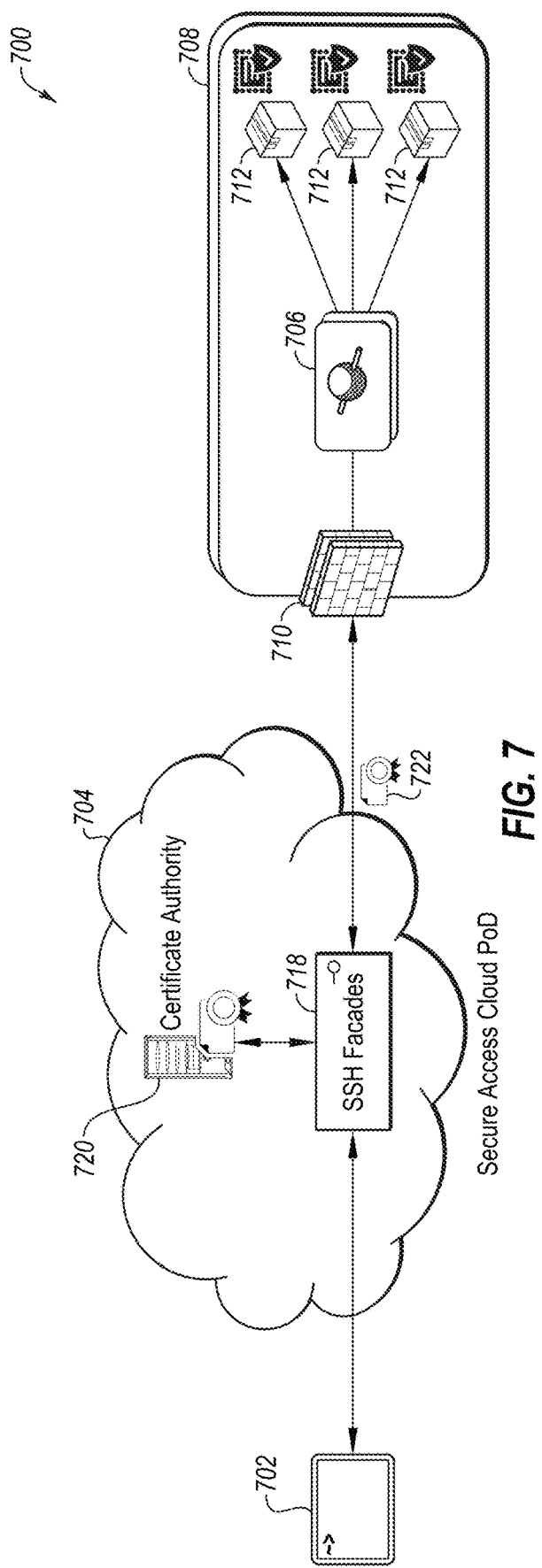
FIG. 7 illustrates authenticating an internal SSH session to a customer's SSH server.

FIG. 7 illustrates a system 700 for authenticating an internal SSH session to a customer's SSH server. As disclosed in FIG. 7, the system 700 may include a secure shell 702, a secure access cloud 704, connectors 706 that are deployed inside corporate datacenters 708 behind firewalls 710, corporate SSH servers 712, SSH facades 718, and a certificate authority (CA) 720. As disclosed in FIG. 7, an administrator may retrieve a public CA certificate 722 from an Administration Portal of the secure access cloud 704 and deploy it on one of the corporate SSH servers 712, configuring the corporate SSH server 712 to use it as a means of validation for session certificates. This procedure may be automated by using central configuration management or cloud initialization scripts for IaaS-based SSH servers. In some embodiments, the secure access cloud 704 may be a multi-tenant service, where each tenant may have its own unique CA 720 initialized upon creation. An option to use a customer-hosted CA may exist, providing it supports the required APIs for automation. Upon successful authentication of the accessing party and authorization to access the specific corporate SSH server 712 with specific session parameters (e.g., session parameters may include many different options, such as, but not limited to, a local account that is used, token/certificate auth that was enforced, SSH "protocol" used—X11, Shell, SCP, SFTP, etc.), an SSH proxy/facade 718 may approach the CA 720 to generate a unique short-lived certificate 722 that has the specific session parameters embedded in it. An internal SSH connection may be initiated using the short-lived certificate 722, authorized by the customer's SSH server 712.

In some embodiments, the whole infrastructure disclosed above in connection with FIG. 7 may be provided as a service. Further, this infrastructure may involve allocating one-time restricted (functionality-wise) SSH certificates per session. Also, this infrastructure may involve performing the above-mentioned functionality transparently after an authentication of the end-user and authorization to the resource (e.g., the corporate SSH server 712). Further, this infrastructure may involve performing the above-mentioned functionality in a manner that does not require any active agent present on the corporate SSH server 712 (e.g., only the certificate itself may be present).

Turning now to governance management inside an SSH broker, some embodiments may involve dealing with controlling SSH (and other SSH-based protocol sessions) in particular, both upon session establishment and during the session. Five different special cases are outlined below, each of which may be a special case of the transparent in-session security controls in a facade, as described above in connection with FIG. 6.

In a first special case, local user accounts and other session parameters may be controlled. Upon completing the authentication of the end user, as disclosed elsewhere herein, the SSH facade 718 may enforce a local access policy. The access policy may take into consideration multiple session properties to decide whether to provide access to the corporate SSH server 712, such as, but not limited to:

1. Requested local SSH account vs allowed local SSH accounts for specific IdP users/groups,
2. Source location/IP of the session vs allowed,
3. Time and day of the session vs allowed,
4. Other locations/open sessions for the same user vs allowed, and/or
5. Device type/identity used by the user vs allowed.

Based on the above settings, the SSH facade 718 may decide to not approve a connection, or may decide to approve a connection with modifications to session parameters (e.g., low privileged account instead of a requested high-privileged account, etc.).

In a second special case, specified authentication types may be enforced. For some sessions/users/groups/conditions/resources, the system 700 may enforce the use of one-time tokens, or multiple authentication factors or certificates, vs other scenarios where just one authentication factor may be enough. This policy may be defined not per device but in generic terms and may take into consideration adaptive dynamic conditions.

Figure 8:
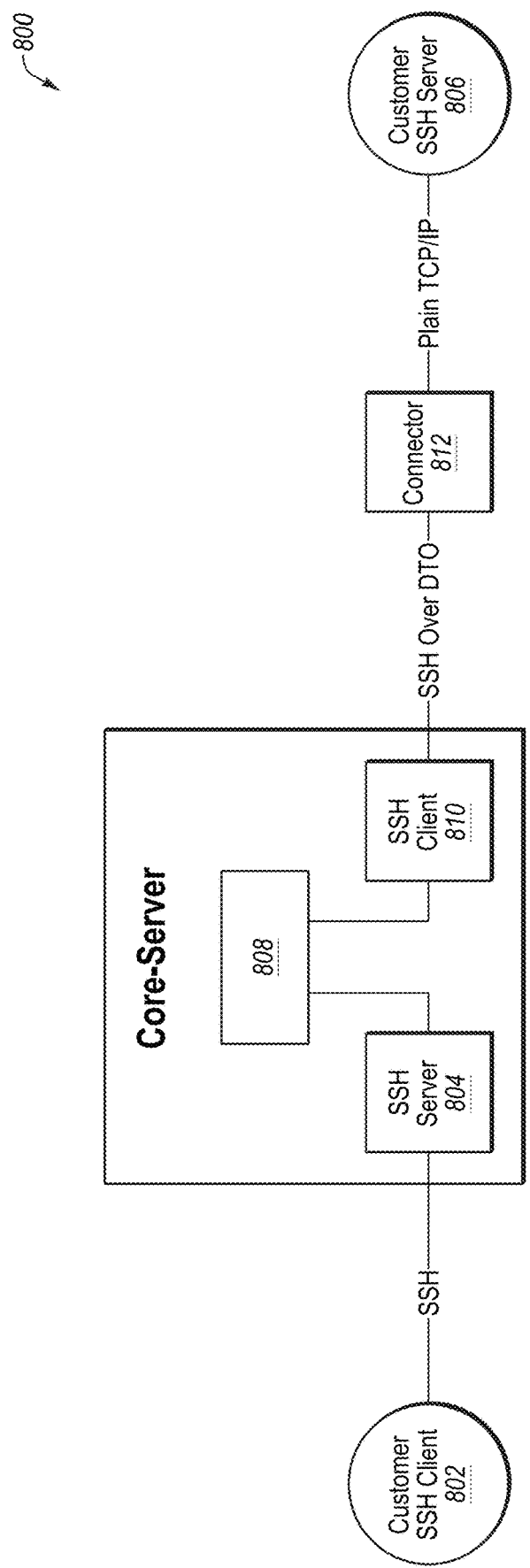
FIG. 8 illustrates controlling specific shell commands, output data, and/or SCP/SFTP files.

In a third special case, specific shell commands, output data, and/or SCP/SFTP files may be controlled. FIG. 8 illustrates a system 800 for controlling specific shell commands, output data, and/or SCP/SFTP files. In some embodiments, every operation performed by the customer SSH client 802 inside an SSH session may be terminated by an internal facade's SSH server 804, analyzed, and then retransmitted to the real customer SSH server 806, as shown in the system 800 of FIG. 8. Similar functions may be performed on responses sent by the customer SSH server 806 to the customer SSH client 802, with the analysis/transformations being performed inside the component 808 illustrated in FIG. 8. This component 808 may have the ability to enforce any kind of transformation and governance policy on the user activity, which may cause any of the following possible results:

1. Allowing the request to be retransmitted as it is to the customer SSH server 806.
2. Allowing the response from the customer SSH server 806 to be retransmitted as it is to the customer SSH client 802.
3. Modifying any part of the request before it is sent to the customer SSH server 806.
4. Modifying any part of the response before it is sent to the customer SSH client 802.
5. Blocking either a request or a response from being sent.
6. Calling an external API, providing it with details about the request/response, including its data and metadata, as well as additional enrichment information loaded from external repositories related to the users, sessions or resources, and modifying/transmitting the request/response based on the response from an external entity (that may or may not involve user-interactive parts).

In a fourth special case, 4-eyes access and operations approval may be enforced. Upon identifying a sensitive operation (e.g., based on a dictionary or any other dynamic logic), an external API may involve an audited 4-eyes approval prior to allowing the request/response to be sent. This can be done either on an attempted connection or on an attempted operation during an ongoing session.

In a fifth special case, a potentially malicious user may be deceived. Upon identifying a malicious or undesired operation, instead of blocking it, some embodiments may deceive the party performing it by providing it false data or a false indication on the result of the performed operation (whereas, in the reality, the operation/response will not be performed/sent).

Turning now to session logging with "tokenization" of sensitive information, some Unix interactive shells that have built-in mechanisms for treating sensitive input, such as, but not limited to, passwords. In some embodiments, interactive shells may handle sensitive input by not showing the typed characters on the Terminal STDOUT stream, unlike when characters are typed and shown for regular, non-sensitive input. Some embodiments involve SSH sessions detecting and logging that sensitive information is being input. For example, when logging user keystrokes and transforming them into actionable commands (e.g., by looking for end-of-line operations and maintaining state in the interactive shell session), some embodiments may proactively identify when a keystroke typed by the user in the SSH client is not being mirrored to the terminal emulation window by the SSH server 804, and thus such keystroke characters may be replaced with benign characters. Thus, if for some reason a sensitive password needs to be typed in an audited session, the audit log that contains all operations performed in the session may not store the sensitive password.

Turning now to support for SCP, SFTP, and/or Tunneling, some embodiments may include application of the features disclosed herein to access sessions various kinds of sessions including, but not limited to, File Transfer, Databases Access, and more, in addition to access sessions based on Web Application/REST API Access or interactive Remote Shell access to virtual/physical computers. In some embodiments, controls disclosed herein (such as modification of requests or responses, 4-eye approval principles, adaptive MFA, and data modification and deception) may be implemented in a similar manner with each of these protocols based on the existing Facades.

Figure 9:
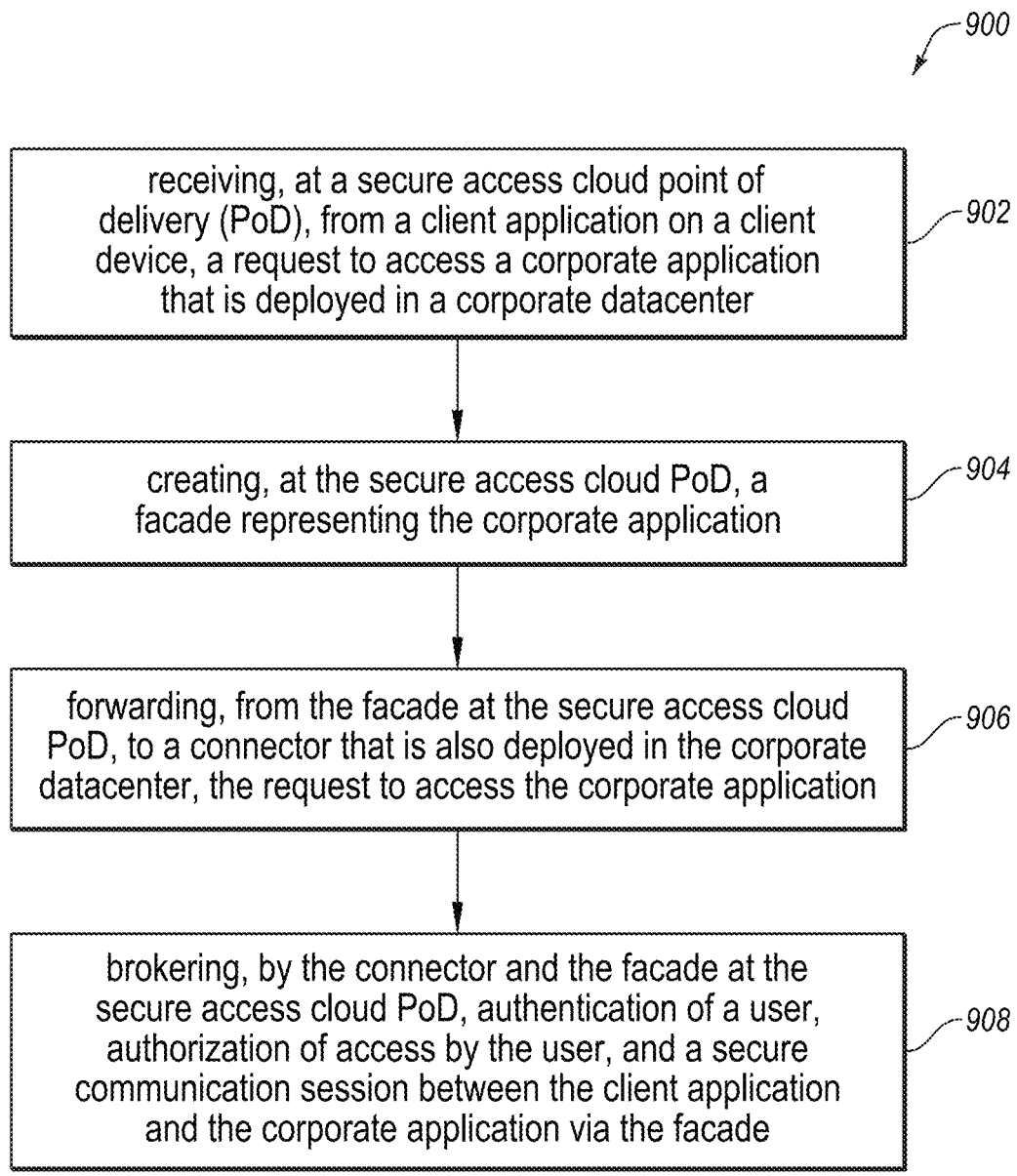
FIG. 9 is a flowchart of an example method for secure access to a corporate application using a facade.

FIG. 9 is a flowchart of an example method 900 for secure access to a corporate application using a facade. The method 900 may be performed, in some embodiments, by a device or system, such as by a connector (e.g., the connector 506 of FIG. 5) deployed inside a corporate datacenter (which may be physical or virtual), a cloud service Point of Delivery (PoD) (e.g., the cloud service PoD 504 of FIG. 5), a corporate resource (e.g., the corporate resource 512 of FIG. 5), and/or a user device (e.g., the client 502 of FIG. 5), a facade (e.g., the facade 518 of FIG. 5), or associated applications thereof. In these and other embodiments, the method 900 may be performed by one or more processors based on one or more computer-readable instructions stored on one or more non-transitory computer-readable media. The method 900 will now be described in connection with FIGS. 1-9.

The method 900 may include, at action 902, receiving, at a secure access cloud point of delivery (PoD), from a client application on a client device, a request to access a corporate application that is deployed in a corporate datacenter. For example, a client application on the client 502 may send and the secure access cloud PoD 504 may receive, at action 902, a request to access a corporate resource 512 that is deployed in a corporate datacenter 508.

The method 900 may include, at action 904, creating, at the secure access cloud PoD, a facade representing the corporate application. In some embodiments, the facade may pose as the corporate application and may behave similarly to the corporate application. In some embodiments, the facade may include a DNS name and port resolving thereto that are unknown to the client application. In these embodiments, when the client application connects to the facade, the client application may believe it is connected to the corporate application. For example, the secure access cloud PoD 504 may create, at action 904, the facade 518 representing the corporate resource 512. In this example, the facade 518 may pose as the corporate resource 512 and may behave similarly to the corporate resource 512. Also, in this example, the facade 518 may include a DNS name and port resolving thereto that are unknown to the client application at the client 502, and when the client application connects to the facade 518, the client application may believe it is connected to the corporate resource 512.

The method 900 may include, at action 906, forwarding, from the facade at the secure access cloud PoD, to a connector that is also deployed in the corporate datacenter, the request to access the corporate application. For example, the secure access cloud PoD 504 may forward, at action 906, the request to access the corporate resource 512 to the connector 506 that is also deployed in the corporate datacenter 508.

The method 900 may include, at action 908, brokering, by the connector and the facade at the secure access cloud PoD, authentication of a user, authorization of access by the user, and a secure communication session between the client application and the corporate application via the façade. In some embodiments, this brokering may occur with no corresponding agent being installed at the client device, and with the client application being unaware that the secure communication session is brokered by the connector and the facade at the secure access cloud PoD. For example, the connector 506 and the facade 518 at the secure access cloud PoD 504 may broker, at action 908, authentication of a user, authorization of access by the user, and a secure communication session between the client application on the client 502 and the corporate resource 512 via the facade 518. In this example, the brokering at action 908 may occur with no corresponding agent being installed at the client 502, and with the client application on the client 502 being unaware that the secure communication session is brokered by the connector 506 and the facade 518 at the secure access cloud PoD 504. Also, in this example, the secure communication session may employ HTTPS, SSH, RDP, SCP, or SFTP.

In some embodiments, the method 900 may further include volumetric logging, by the facade at the secure access cloud PoD, of the secure communication session, auditing, by the facade at the secure access cloud PoD, of the secure communication session, analyzing and modifying, by the facade at the secure access cloud PoD, a request or a response of the secure communication session, analyzing and delaying, by the facade at the secure access cloud PoD, a request or a response of the secure communication session, and/or analyzing and dropping, by the facade at the secure access cloud PoD, a request or a response of the secure communication session. For example, the facade 518 at the secure access cloud PoD 504 may perform volumetric logging of the secure communication session, auditing of the secure communication session, analyzing and modifying a request or a response of the secure communication session, analyzing and delaying a request or a response of the secure communication session, and/or analyzing and dropping, by the facade at the secure access cloud PoD, a request or a response of the secure communication session.

In some embodiments, the method 900 may further include identifying, by the facade at the secure access cloud PoD, a sensitive command about to be executed by the client application, and sending, by the facade at the secure access cloud PoD, a notification to an IT administrator regarding the sensitive command. For example, the facade 518 at the secure access cloud PoD 504 may identify a sensitive command about to be executed by the client application at the client 502, and may send a notification to an IT administrator regarding the sensitive command.

In some embodiments, the client application may be an SSH client application, and the corporate application to which the SSH client application requests access at action 902 may be a corporate SSH server. In these embodiments, the facade created at action 904 may represent the corporate SSH server. In these embodiments, a public certificate authority (CA) certificate may be deployed on the corporate SSH server. In these embodiments, the corporate SSH server may be configured to validate session certificates of the secure communication session. Also, in these embodiments, no active agent may be present at the corporate SSH server. For example, the secure shell 702 may request access to the corporate SSH server 712, and the SSH facade 718 may represent the corporate SSH server 712, on which a public CA certificate 722 may be deployed, and which may be configured to validate session certificates of the secure communication session.

In some embodiments, the method 900 may further include causing, by the facade at the secure access cloud PoD, a certificate authority (CA) to generate a unique short-lived certificate for the secure communication session that has specific session parameters embedded therein, enforcing, by the facade at the secure access cloud PoD a local access policy to decide whether to provide access to the corporate SSH server, specified authentication types, and/or 4-eyes access and operations approval, controlling, by the facade at the secure access cloud PoD specific shell commands, output data, Secure Copy Protocol (SCP) files, and/or SSH File Transfer Protocol (SFTP) files, and/or deceiving, by the facade at the secure access cloud PoD, a potentially malicious user by providing the potentially malicious user with false data and/or a false indication on a result of a performed operation. For example, the SSH facade 718 may cause the CA 720 to generate a unique short-lived certificate 722 for the secure communication session that has specific session parameters embedded therein, enforce a local access policy to decide whether to provide access to the corporate SSH server 712, specify authentication types and/or 4-eyes access and operations approval, control specific shell commands, output data, SCP files, and/or SFTP files, deceiving a potentially malicious user by providing the potentially malicious user with false data and/or a false indication on a result of a performed operation.

In some embodiments, the method 900 may further include detecting and logging, by the SSH client application, sensitive information being input by the user to avoid the sensitive information being logged in an audit log by replacing the sensitive information with benign characters in the audit log. For example, the secure shell 702 may detect and log sensitive information being input by the user to avoid the sensitive information being logged in an audit log by replacing the sensitive information with benign characters in the audit log.

The method 900 may thus be employed, in some embodiments, to accomplish secure access to a corporate resource 512 using a facade 518. Although the actions of the method 900 are illustrated in FIG. 9 as discrete actions, various actions may be divided into additional actions, combined into fewer actions, reordered, expanded, or eliminated, depending on the desired implementation.

Further, it is understood that the method 900 may improve the functioning of a computer system itself, and improve the technical field of secure communication sessions. For example, the functioning of corporate resource 512 may be improved by the method 900 due to a client application on the client 502 being granted secure access to the corporate resource 512 by the brokering of a secure communication session by the facade 518 at the secure access cloud PoD 504 and the connector 506. Further, this may be accomplished with no corresponding agent being installed at the client 502, and with the client application at the client 502 being unaware that the secure communication session is brokered by the connector 506 and the facade 518 at the secure access cloud PoD 504, unlike conventional VPN software which generally requires an agent to be installed on the client.

Figure 10:
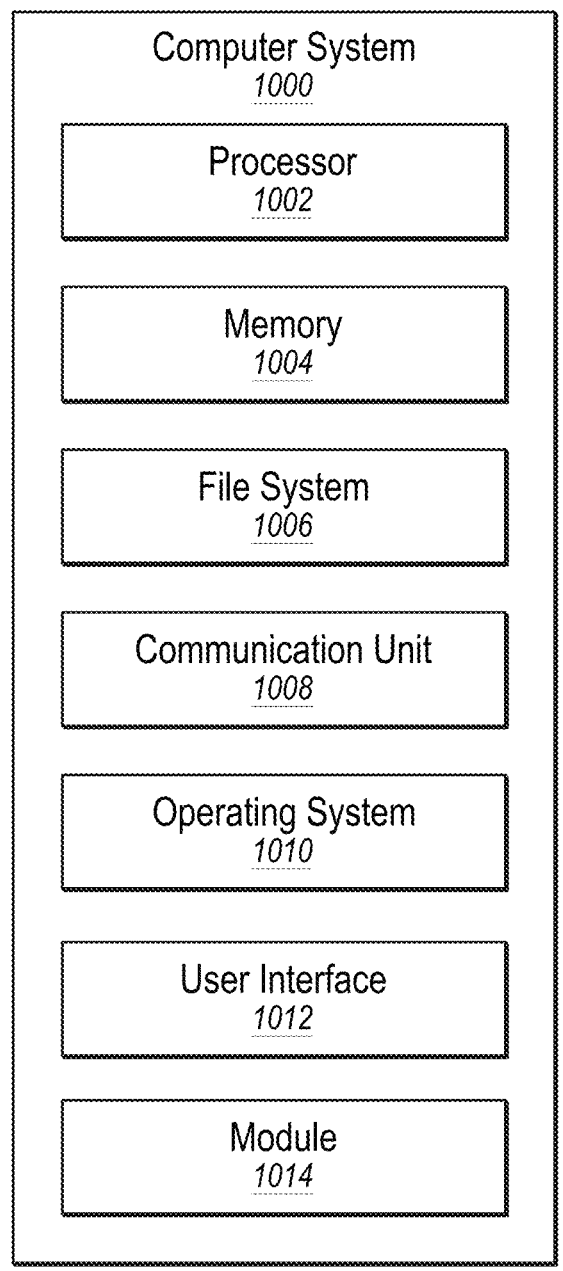
FIG. 10 illustrates an example computer system that may be employed in secure access to a corporate application using a facade.

FIG. 10 illustrates an example computer system 1000 that may be employed in providing secure access to a corporate application using a facade. In some embodiments, the computer system 1000 may be part of any of the systems or devices described in this disclosure. For example, the computer system 1000 may be part of any client, server, cloud service, firewall, connector, facade, or resource of FIGS. 1-9.

The computer system 1000 may include a processor 1002, a memory 1004, a file system 1006, a communication unit 1008, an operating system 1010, a user interface 1012, and a module 1014, which all may be communicatively coupled. In some embodiments, the computer system may be, for example, a desktop computer, a client computer, a server computer, a workstation computer, a mobile phone, a laptop computer, a smartphone, a smartwatch, a tablet computer, a portable music player, or any other computer system.

Generally, the processor 1002 may include any suitable special-purpose or general-purpose computer, computing entity, or processing device including various computer hardware or software applications and may be configured to execute instructions stored on any applicable computer-readable storage media. For example, the processor 1002 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 1002 may interpret and/or execute program instructions and/or process data stored in the memory 1004 and/or the file system 1006. In some embodiments, the processor 1002 may fetch program instructions from the file system 1006 and load the program instructions into the memory 1004. After the program instructions are loaded into the memory 1004, the processor 1002 may execute the program instructions. In some embodiments, the instructions may include the processor 1002 performing one or more steps of the processes disclosed herein.

The memory 1004 and the file system 1006 may include computer-readable storage media for carrying or having stored thereon computer-executable instructions or data structures. Such computer-readable storage media may be any available non-transitory media that may be accessed by a general-purpose or special-purpose computer, such as the processor 1002. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1002 to perform a certain operation or group of operations, such as one or more steps of the processes disclosed herein. These computer-executable instructions may be included, for example, in the operating system 1010, in one or more modules, such as the module 1014, or in some combination thereof.

The communication unit 1008 may include any component, device, system, or combination thereof configured to transmit or receive information over a network. In some embodiments, the communication unit 1008 may communicate with other devices at other locations, the same location, or even other components within the same system. For example, the communication unit 1008 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 1008 may permit data to be exchanged with a network and/or any other devices or systems, such as those described in the present disclosure.

The operating system 1010 may be configured to manage hardware and software resources of the computer system 1000 and configured to provide common services for the computer system 1000.

The user interface 1012 may include any device configured to allow a user to interface with the computer system 1000. For example, the user interface 1012 may include a display, such as an LCD, LED, or other display, that is configured to present video, text, application user interfaces, and other data as directed by the processor 1002. The user interface 1012 may further include a mouse, a track pad, a keyboard, a touchscreen, volume controls, other buttons, a speaker, a microphone, a camera, any peripheral device, or other input or output device. The user interface 1012 may receive input from a user and provide the input to the processor 1002. Similarly, the user interface 1012 may present output to a user.

The module 1014 may be one or more computer-readable instructions stored on one or more non-transitory computer-readable media, such as the memory 1004 or the file system 1006, that, when executed by the processor 1002, is configured to perform one or more steps of the processes disclosed herein. In some embodiments, the module 1014 may be part of the operating system 1010 or may be part of an application of the computer system 1000, or may be some combination thereof. In some embodiments, the module 1014 may function as any software component disclosed herein.

Modifications, additions, or omissions may be made to the computer system 1000 without departing from the scope of the present disclosure. For example, although each is illustrated as a single component in FIG. 10, any of the components 1002-1014 of the computer system 1000 may include multiple similar components that function collectively and are communicatively coupled. Further, although illustrated as a single computer system, it is understood that the computer system 1000 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 1002 of FIG. 10) including various computer hardware or software applications, as discussed in greater detail below. Further, as indicated above, embodiments described herein may be implemented using computer-readable media (e.g., the memory 1004 or file system 1006 of FIG. 10) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method comprising:
receiving, at a secure access cloud point of delivery (PoD), from a client application on a client device, a request to access a corporate application that is deployed in a corporate datacenter, wherein the secure access cloud PoD is isolated from the corporate datacenter;
creating, at the secure access cloud PoD, a facade representing the corporate application, wherein the façade replicates, at least in part, portions of the corporate application;
forwarding, from the facade at the secure access cloud PoD, to a connector that is also deployed in the corporate datacenter, the request to access the corporate application; and
brokering, by the connector and the facade at the secure access cloud PoD, authentication of a user, authorization of access by the user, and a secure communication session between the client application and the corporate application via the facade, with no corresponding agent being installed at the client device, and with the client application being unaware that the secure communication session is brokered by the connector and the facade at the secure access cloud PoD, wherein brokering the secure communication session between the client application and the corporate application includes establishing a communication channel between the facade at the secure access cloud PoD and the connector, and wherein communication between the client application and the corporate application is conducted via the facade at the secure access cloud PoD and the connector at the corporate datacenter over the communication channel.

2. The method of claim 1, wherein the facade poses as the corporate application and behaves similarly to the corporate application.

3. The method of claim 1, wherein the facade includes a DNS name and port resolving thereto that are unknown to the client application.

4. The method of claim 3, wherein when the client application connects to the facade, the client application believe it is connected to the corporate application.

5. The method of claim 1, further comprising volumetric logging, by the facade at the secure access cloud PoD, of the secure communication session.

6. The method of claim 1, further comprising auditing, by the façade at the secure access cloud PoD, of the secure communication session.

7. The method of claim 1, further analyzing and modifying, by the facade at the secure access cloud PoD, a request or a response of the secure communication session.

8. The method of claim 1, further analyzing and delaying, by the facade at the secure access cloud PoD, a request or a response of the secure communication session.

9. The method of claim 1, further analyzing and dropping, by the facade at the secure access cloud PoD, a request or a response of the secure communication session.

10. The method of claim 1, further comprising:
identifying, by the facade at the secure access cloud PoD, a sensitive command about to be executed by the client application, and
sending, by the facade at the secure access cloud PoD, a notification to an IT administrator regarding the sensitive command.

11. The method of claim 1, wherein the secure communication session employs Hypertext Transfer Protocol Secure (HTTPS), Secure Shell (SSH), Remote Desktop Protocol (RDP), Secure Copy Protocol (SCP), or SSH File Transfer Protocol (SFTP).

12. A computer-implemented method comprising:
receiving, at a secure access cloud point of delivery (PoD), from an SSH client application on a client device, a request to access a corporate SSH server that is deployed in a corporate datacenter, wherein the secure access cloud PoD is isolated from the corporate datacenter;
creating, at the secure access cloud PoD, a facade representing the corporate SSH server, wherein the façade replicates, at least in part, portions of the corporate application;
forwarding, from the facade at the secure access cloud PoD, to a connector that is also deployed in the corporate datacenter, the request to access the corporate SSH server; and
brokering, by the connector and the facade at the secure access cloud PoD, authentication of a user, authorization of access by the user, and a secure communication session between the SSH client application and the corporate SSH server via the facade, with no corresponding agent being installed at the client device, and with the SSH client application being unaware that the secure communication session is brokered by the connector and the facade at the secure access cloud PoD, wherein brokering the secure communication session between the client application and the corporate SSH server includes establishing a communication channel between the facade at the secure access cloud PoD and the connector, and wherein communication between the client application and the corporate SSH server is conducted via the facade at the secure access cloud PoD and the connector at the corporate datacenter over the communication channel.

13. The method of claim 12, wherein a public certificate authority (CA) certificate is deployed on the corporate SSH server.

14. The method of claim 13, wherein the corporate SSH server is configured to validate session certificates of the secure communication session.

15. The method of claim 13, wherein no active agent is present at the corporate SSH server.

16. The method of claim 12, further comprising causing, by the facade at the secure access cloud PoD, a certificate authority (CA) to generate a unique short-lived certificate for the secure communication session that has specific session parameters embedded therein.

17. The method of claim 12, further comprising enforcing, by the facade at the secure access cloud PoD:

a local access policy to decide whether to provide access to the corporate SSH server;
specified authentication types; and/or
4-eyes access and operations approval.

18. The method of claim 12, further comprising controlling, by the facade at the secure access cloud PoD:

specific shell commands;
output data;
Secure Copy Protocol (SCP) files; and/or
SSH File Transfer Protocol (SFTP) files.

19. The method of claim 12, further comprising deceiving, by the facade at the secure access cloud PoD, a potentially malicious user by providing the potentially malicious user with false data and/or a false indication on a result of a performed operation.

20. The method of claim 12, further comprising detecting and logging, by the SSH client application, sensitive information being input by the user to avoid the sensitive information being logged in an audit log by replacing the sensitive information with benign characters in the audit log.

* * * * *

UNITED STATES PATENT AND TRADEMARK OFFICE
CERTIFICATE OF CORRECTION

| | |
|---|---|
| PATENT NO. | : 11,442,755 B1 |
| APPLICATION NO. | : 16/591335 |
| DATED | : September 13, 2022 |
| INVENTOR(S) | : David Patimer et al. |

It is certified that error appears in the above-identified patent and that said Letters Patent is hereby corrected as shown below:

In the Claims

Replace Column 20, Line 19 with:
7. The method of claim 1, further comprising analyzing and modifying,
by the facade at the secure access cloud PoD, a request
or a response of the secure communication session.

Replace Column 20, Line 22 with:
8. The method of claim 1, further comprising analyzing and delaying,
by the facade at the secure access cloud PoD, a request or a
response of the secure communication session.

Replace Column 20, Line 25 with:
9. The method of claim 1, further comprising analyzing and dropping,
by the facade at the secure access cloud PoD, a request or a
response of the secure communication session.

Signed and Sealed this
First Day of November, 2022

Katherine Kelly Vidal
*Director of the United States Patent and Trademark Office*